Nov. 6, 1934.     O. A. BANNER     1,979,306
SPLIT ROLLER COUPLING
Filed Nov. 14, 1931     2 Sheets-Sheet 1
Fig. 1.
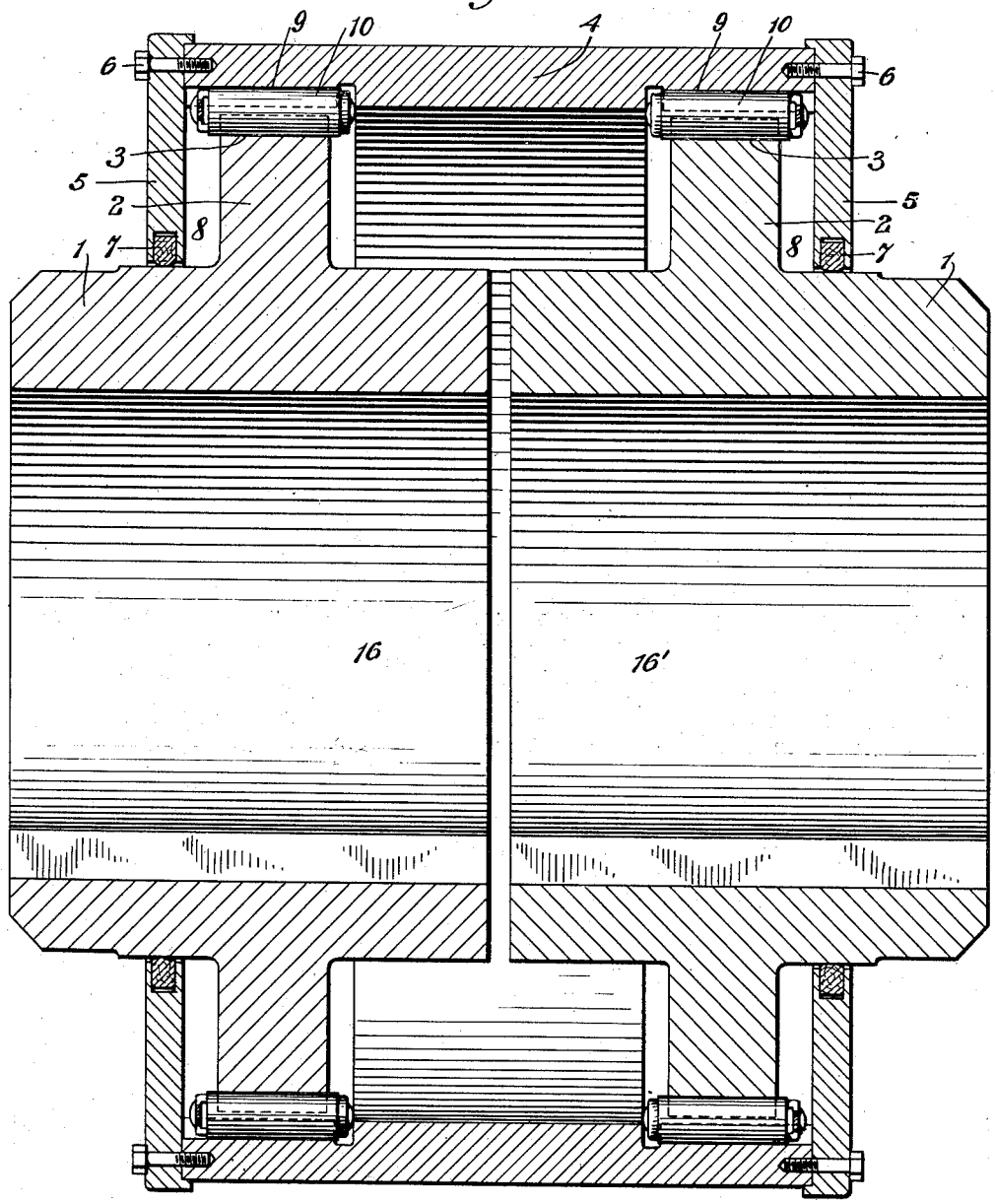
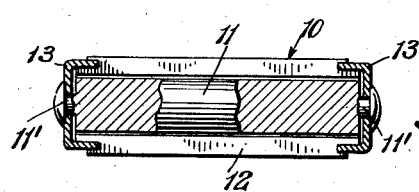
Fig. 4.
INVENTOR
Otto A. Banner
BY C. Campbell Huncke
ATTORNEY

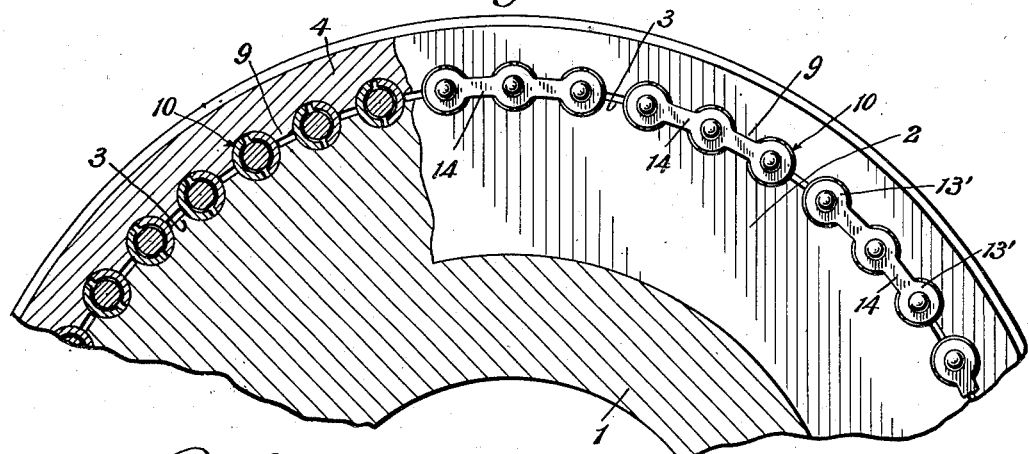
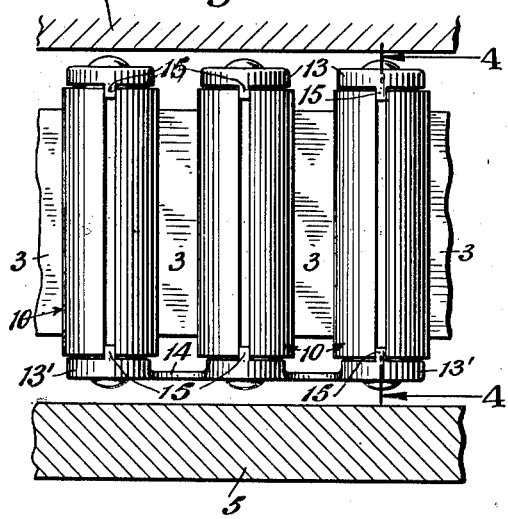
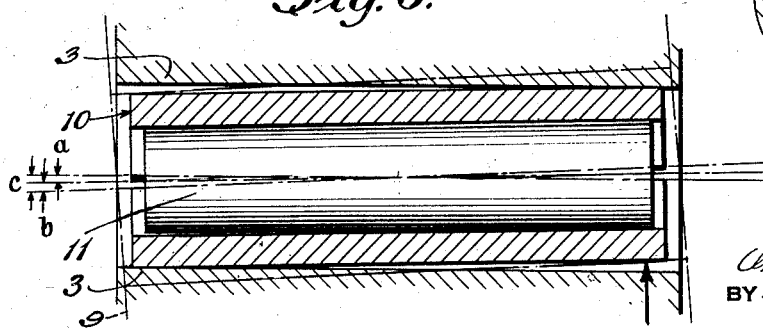
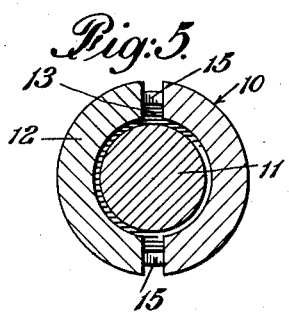

Patented Nov. 6, 1934

1,979,306

UNITED STATES PATENT OFFICE 1,979,306

SPLIT ROLLER COUPLING

Otto A. Banner, Highland Park, N. J., assignor to John Waldron Corporation, New Brunswick, N. J., a corporation of New Jersey Application November 14, 1931, Serial No. 575,010

6 Claims. (Cl. 64—89)

This invention relates to a compact shaft coupling.

Many forms of couplings have been designed to transmit power from one shaft to another. The problem would be a simple one were it not for the misalinement of the shafts and the difficulty of lubrication.

In most couplings a greater size is required than should be theoretically necessary because of misalinement.

The various types of couplings may be divided into resilient and positive drive couplings. This invention is of the positive or gear type coupling.

It is not generally recognized that the oil film is an important element in the life of a coupling, although it is recognized that lubrication of the contacting parts is advisable. In a dry coupling of the gear type only two teeth are in contact. If a lubricant is used a film is formed and in consequence more teeth are contacting. Increasing the depth of lubricant film increases the number of teeth in contact and hence increases the strength or capacity of the coupling. However, the depth of the oil film that can be formed is limited and therefore it forms a limiting element, in the amount of clearance between the teeth that can be utilized, to have the greater proportion of the teeth contacting. The limitation of the amount of clearance places a limitation on the amount of misalinement that can be handled by the coupling.

One of the objects of this invention is to provide a coupling for shafts that will carry the required load under greater degree of misalinement of the shafts than is generally possible in the customary gear type coupling of the same size.

Another object of the invention is to provide a gear type coupling that will function properly and be composed of the minimum number of elements.

Still another object of the invention is to provide a coupling of relatively small mass but capable of handling greater degrees of misalinement of the shafts by increasing the number of oil films.

A still further object of the invention is to provide a coupling having relatively small mass.

Referring to the drawings:

Figure 1 is a longitudinal cross sectional view of a coupling embodying the principles of my invention.

Figure 2 is a parallel sectional view of Figure 1 along the line 2, 2, looking in the direction of the arrows.

Figure 3 is a detailed view of the rollers.

Figure 4 is a sectional view of Figure 3 along the line 4, 4, looking in the direction of the arrows.

Figure 5 is a sectional view of Figure 4 along the line 5, 5, looking in the direction of the arrows.

Figure 6 is a diagrammatic view of a roller and casing when the shafts are misalined.

In carrying out my invention, I provide two hubs 1, 1, each having disks 2 integral therewith. Said disks 2 having a rim of teeth 3. A cover 4 formed of a single piece of metal has end plates 5 secured by bolts 6 thereto. Oil rings 7 are positioned in the bottom of end plates 5 and are adapted to bear against hubs 1 to retain the oil in chambers 8 even when the cover is tilted with respect to the hubs. Integral with cover 4 are teeth 9 corresponding to teeth 3 of the hubs 1. Teeth 9 and teeth 3 form semi-circular chambers for rollers 10. Rollers 10 are of special construction having a central roller 11, casing 12 and cages 13, 13'. Rollers 11 have their shafts 11' journaled in cages 13, 13' and have upset ends to retain cages 13, 13', thereon. Casings 12 have a limited freedom of movement with respect to rollers 11 or cages 13, 13', being prevented from removal from rollers 11 by the cages 13, 13', and prevented from rotation by lugs 15'. Cages 13' are joined in sets of threes by arms 14. Cages 13 are not joined. There is clearance between rollers 11 and the interior of casings 12. The structure permits of a tilting movement of rollers 11 with respect to casings 12. The casings and rollers 11 forming rollers 10 may also tilt with respect to teeth 9 and 3.

If the shafts 16, 16', are in alinement rollers 10 will rest with their centers parallel to teeth 9 and 3. If there is misalinement in the shaft, rollers 11 and casing 12 will no longer be parallel to the teeth but will tilt as shown in Figures 7 and 8, first the casing 12 tilts and then the roller 11 and when the degree of misalinement becomes sufficiently great, casing 12 will contact with the teeth 9 and 3 at the opposite ends and roller 11 will likewise contact with the opposite ends of the internal walls of casing 12, it being understood that there is an oil film between the contacting surfaces. By utilizing casing 12, the angle c of the roller for maximum misalinement is reduced and the number of oil films are increased hence for the same degree of misalinement, a smaller coupling can be used. If two gears are meshing and oil is used there will be one oil film between the gears. In this invention there is an oil film between the casing and teeth 9 and 3. Theoretically, if more casings were placed about roller 1, increased number of oil films could be obtained and greater misalinement could be accommodated. However, other factors enter into increasing the number of casings. For instance, as the diameter of roll 10 is enlarged by reason of the casings, teeth 9 and 11 must be made thinner or the diameter of disk 2 must be increased thereby increasing the weight. I therefore preferably utilize one casing 12. By securing the ends of rollers 11 to cages 13' in threes the rollers 11 and casings 12 operate to divide the angle due to misalinement otherwise there would be a tendency for rollers 11 and casings 12 to remain parallel and there would be no distribution of the misalinement between the two parts of rollers 10.

The important parts of the rollers are the core rolls 11 and the two split shells or sleeves 12. The shells should be disposed so that when the coupling is under the action of a torque one of the shells shall receive the thrust and transmit it to the core roll. The core roll 11 transmits it to the other shell 12 which in turn transmits it to the cooperating torque transmitter, for instance, a hub tooth delivers its thrust to one shell, then the other shell transmits it to the corresponding cover tooth. This action is clearly understandable when one looks at Figures 1 and 2.

Cages 13, 13', have only one function, that is, they maintain and secure correct position of shells 12 so that the slots are as near as possible in radial planes. If we omit the cages the two shells would be free to turn and correct assembly would be almost impossible. In addition, should they turn sufficiently, then the action of the shells would be uncertain. For this reason the cages are required. Although it is only necessary to connect two rollers by one cage, I have found it more desirable to connect three, thereby reducing the number of cages and securing a greater certainty of the proper functioning of the cages. Lugs 15 must have ample clearance between the two shells 12 to permit of independent cocking. The whole function of lugs 15 is to prevent the shells 12 from turning and therefore they must not fit too closely to bind or transmit thrust from one shell to another.

It will thus be seen that by the use of intermediate loose elements between the driving and driven elements two additional oil films are added thereby permitting greater clearances and permitting the coupling to function under greater degrees of misalinement. Although I have shown the loose cover element in connection with a roller coupling, yet it can also be used in connection with any positively driven coupling such as the gear coupling shown in my copending application, Serial No. 572,743, filed November 3, 1931.

Furthermore, the combined loose casing and roller cooperate to absorb the misalinement and permit of a decrease in the size of the coupling for the same amount of misalinement that could be absorbed by the usual gear type coupling and the amount of misalinement that is absorbed is divided between the loose casing and roller in practically equal amounts.

What I claim is:

1. In a shaft coupling, hubs having external teeth, a cover having internal teeth in radial relation but not meshing with the external teeth of the hubs, connectors in the gaps of radially related internal and external teeth, said connectors comprising internal and external elements, said external elements formed of two separate portions, one of said portions being a driven and the other a driving portion, said internal elements tiltable with respect to said external elements.

2. In a gear type shaft coupling, a hub having external teeth, a cover having internal teeth in radial relation with the external teeth of said hub but not meshing therewith, intermediate builtup cylindrical elements formed of an internal roller and two external semi-cylindrical elements each of said elements interposing an oil film between said teeth.

3. In a shaft coupling, hubs having external teeth, a cover having internal teeth, said cover teeth and said hub teeth not meshing intermediate connectors between the gaps of said teeth, said connectors comprising an inner roll and an outer split cylindrical casing, cages for the end of said rolls and casings, the cages on one side connected in groups, the rolls within said casings having a limited freedom of movement to permit of tilting with respect to the casings.

4. In a shaft coupling, gears carried by said hubs, a cover, gears within said cover, lubricated intermediate elements between said gears, said elements comprising an inner roller, an outer casing surrounding said inner roller and tiltable with respect to said inner roller and connecting means between said casing and inner roller to permit the tilting of said outer casing with respect to said inner roller.

5. In a shaft coupling, hubs, external teeth surrounding said hubs, a cover, internal gears integral with said cover and surrounding said hub gears but not contacting therewith, means connecting said hub gears and said cover gears, said means having internal and external elements, said external elements formed in separate semi-cylindrical halves, one of said halves being a driven element and the other a driving element, said internal element adapted to tilt upon misalinement of the shafts.

6. In a shaft coupling, two hubs, gears carried by said hubs, a cover, gears within said cover, intermediate connectors between said gears and said cover, each of said connectors comprising an inner roller and an outer casing movable with respect to said inner roller.

OTTO A. BANNER.